(12) United States Patent
Qin et al.

(10) Patent No.: US 10,074,070 B2
(45) Date of Patent: Sep. 11, 2018

(54) METHODS AND SYSTEMS FOR PRIORITIZING STOCK-KEEPING UNITS IN COST-BASED INVENTORY ALLOCATION

(71) Applicant: Wal-Mart Stores, Inc., Bentonville, AR (US)

(72) Inventors: Zhiwei Qin, San Mateo, CA (US); Arash Asadi-Shahmirzadi, San Bruno, CA (US); Jagtej Bewli, San Mateo, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 905 days.

(21) Appl. No.: 14/501,862

(22) Filed: Sep. 30, 2014

(65) Prior Publication Data

US 2016/0092831 A1 Mar. 31, 2016

(51) Int. Cl.
| | |
|---|---|
| *G06Q 10/00* | (2012.01) |
| *G06Q 10/08* | (2012.01) |
| *G06Q 10/06* | (2012.01) |
| *G06Q 30/00* | (2012.01) |
| *G06K 7/10* | (2006.01) |

(52) U.S. Cl.
CPC ....... *G06Q 10/087* (2013.01); *G06K 7/10366* (2013.01); *G06Q 10/06313* (2013.01); *G06Q 10/08* (2013.01); *G06Q 10/0875* (2013.01); *G06Q 30/018* (2013.01)

(58) Field of Classification Search
CPC .. G06Q 10/087; G06Q 10/08; G06Q 10/0875; G06Q 30/018; G06K 7/10366

USPC .......................................................... 705/28
See application file for complete search history.

(56) References Cited

U.S. PATENT DOCUMENTS

2011/0295413 A1* 12/2011 Hara .................... G06Q 10/087
                                                            700/216
2015/0106224 A1*  4/2015 Stevens .............. G06Q 30/0631
                                                            705/26.7

OTHER PUBLICATIONS

Dworak, David D. Victory's foundation: US logistical support of the Allied Mediterranean Campaign, 1942-1945. Syracuse University, ProQuest Dissertations Publishing, 2011.*

* cited by examiner

Primary Examiner — Florian M Zeender
Assistant Examiner — Fawaad Haider
(74) Attorney, Agent, or Firm — Bryan Cave Leighton Paisner LLP

(57) ABSTRACT

Various examples of methods and systems for prioritizing identifier in cost-based inventory allocation are described. In one implementation, a method may determine a shipping cost sensitivity of each identifier of a plurality of identifiers of a plurality of items in an inventory, the shipping cost sensitivity of each identifier related to sales volume, billable weight and shipping zone associated with the respective identifier. The method may also rank the plurality of identifiers based at least in part on the shipping cost sensitivity of each identifier. The method may further determine an order of allocation of the inventory of the plurality of items based at least in part on the ranking of the plurality of identifiers.

20 Claims, 6 Drawing Sheets

METHODS AND SYSTEMS FOR PRIORITIZING STOCK-KEEPING UNITS IN COST-BASED INVENTORY ALLOCATION

TECHNICAL FIELD

The present disclosure relates to methods and systems for prioritizing stock-keeping units (SKU) in cost-based inventory allocation.

BACKGROUND

In the field of inventory management, a SKU is usually a distinct item, whether a product or service, as it is offered for sale that embodies attributes associated with the item and that distinguish it from all other items. That is, a SKU is the smallest unit that can be offered for sale or counted as inventory, and a SKU of an item can be considered as a unique identifier of that item. For a product, the attributes of the SKU may include the product's manufacturer, product description, material, size, color, packaging, warranty, etc.

In cost-based inventory allocation, it is often important to determine the relative value of a SKU from the perspective of cost savings in terms of shipping. In particular, when SKUs are allocated sequentially, the ranking of SKUs is crucial for optimization of inventory allocation.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
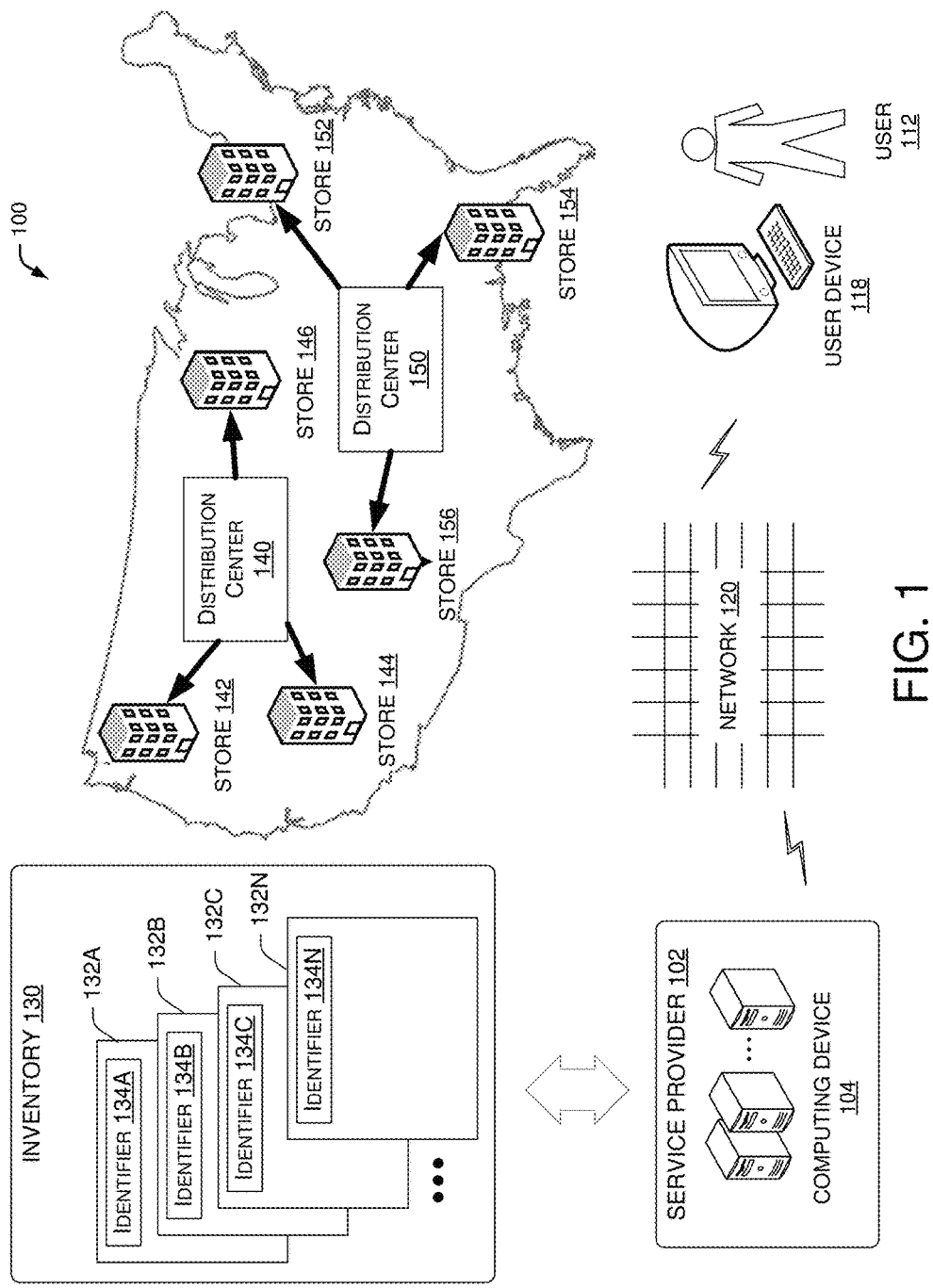
FIG. 1 is a block diagram depicting an example computing environment within which an example embodiment of prioritizing SKU in cost-based inventory allocation in accordance with the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

In the sequential optimization paradigm in which SKUs are allocated sequentially, the rule of thumb is that higher-ranked SKUs are subject less to capacity and SKU count constraints of a distribution counter, and hence tend to be allocated optimally. Conversely, lower-ranked SKUs are usually subject to stringent constraints, leading to much less optimal allocation of associated items. Therefore, SKUs with shipping cost affected by allocation decision the most are ranked higher to be allocated first.

The present disclosure provides a novel ranking algorithm for SKUs based on each SKU's shipping cost sensitivity with respect to the allocation decision. The ranking algorithm determines the priority level of SKUs in cost-based inventory allocation. The metric used may be based on the shipping cost sensitivity with respect to shipping zone. The resulting ordered list of ranked SKUs are used in a sequential network optimization algorithm to allocate the inventory of the SKUs across an electronic-commerce (e-commerce) vendor's network of distribution centers, e.g., warehouses. That is, in terms of allocation of the inventor of the SKUs, the proposed scheme would produce a plan for a future period of time, e.g., a number of weeks, to stock a given percentage of a total inventory in a particular distribution center or warehouse. The plan may also indicate when to restock the inventory and so on. An allocation plan for higher-ranking SKUs would be determined first before an allocation plan for lower-ranking SKUs. Higher-ranking SKUs are subject to less capacity constraints of the distribution center compared to lower-ranking SKUs. Accordingly, higher-ranking SKUs are stocked first in a given distribution center, and remaining space in the distribution center is allocated to lower-ranking SKUs, thereby resulting in optimal allocation and stocking of the items associated with higher-ranking SKUs.

It will be appreciated that, although illustrative examples herein refer to SKUs of items, various embodiments of the present disclosure may be implemented using any other type of unique identifiers of items such as, for example, universal product code (UPC), media access control (MAC) address, etc. For instance, embodiments of the present disclosure may be implemented with MAC addresses formed according to the rules of one of three numbering name spaces managed by the Institute of Electrical and Electronics Engineers (IEEE), namely: MAC-48, EUI-48, and EUI-64.

In the present disclosure, the term "shipping zone" or "zone" refers to the concept of shipping distance. For example, shipment of a package from a source to a destination within the same city may be a two-zone shipment. Moreover, a cross-continental shipment, e.g., from the West Coast to the East Coast of the United States, may be an eight-zone shipment. The granularity of zoning to represent the shipping distance may be varied to be coarser or more granular depending on the actual implementation of embodiments of the present disclosure.

In the present disclosure, the term "rate card" refers to a price list of shipping costs offered by a carrier. A rate card states the unit shipping cost for a given combination of shipping zone and weight of the item being shipped.

In the present disclosure, the term "site-to-store" refers to a shipping/delivery method specific to a given vendor. A customer's order is shipped from a distribution center of the vendor, e.g., an e-commerce vendor, to a physical retail store of the customer's choice for the customer to pick up. This shipping method may be free of charge for the customer.

In the present disclosure, the term "back-haul routes" refers to those shipping routes for site-to-store orders that yield high cost savings. When a particular distribution center-retail store combination has sufficient site-to-store orders shipped therebetween, a significant portion of those orders may be carried by the vendor's own trucks which routinely travel from the particular distribution center to the particular retail store to replenish that store's inventory. The shipping cost of this method tends to be negligible compared to third-party carriers' rate card.

FIG. 1 is a block diagram depicting an example computing environment 100 within which an example embodiment of prioritizing SKU in cost-based inventory allocation in accordance with the present disclosure may be implemented. Example computing environment 100 includes a computing device 104 associated with a service provider 102. Service provider 102 may provide a service related to prioritizing SKU in cost-based inventory allocation. For example, the service may include a set of related software and/or hardware functionalities that, together with certain policies set by service provider 102, enable a vendor, e.g., an e-commerce vendor, to manage an inventory 130 associated with distribution centers 140 and 150 as well as stores 142, 144, 146, 152, 154 and 156. Some or all of inventory 130, distribution centers 140 and 150, and stores 142, 144, 146, 152, 154 and 156 may be owned and operated by the same vendor or different vendors.

As illustrated in FIG. 1, inventory 130 includes numerous items, e.g., products, such as items 132A-132N. Each of items 132A-132N is respectively identified by a unique identifier such as one of unique identifiers 134A-134N. In the description of example computing environment 100, each of the unique identifiers 134A-134N is a SKU. However, in various embodiments other types of unique identifiers, e.g., UPCs and MAC addresses, may be used to uniquely identify each of items 132A-132N. Inventory 130 represents a totality of inventory of items, represented by items 132A-132N, to be stocked in numerous distribution centers, or warehouses, represented by distribution centers 140 and 150, from which the items are shipped to numerous physical stores, represented by stores 142, 144, 146, 152, 154 and 156. Each of distribution centers 140 and 150 and stores 142, 144, 146, 152, 154 and 156 is disposed at a respective geographic location. Accordingly, the shipping distance between a given distribution center, e.g., distribution center 140, and one store, e.g., store 142, may be different from the shipping distance between the given distribution center and another store, e.g., store 144. In FIG. 1, the arrow between a given distribution center and a given store indicates items to be stocked in the given store are shipped from the given distribution center.

Computing device 104 may determine a shipping cost sensitivity of each identifier of a plurality of identifiers of a plurality of items in an inventory. For example, computing device 104 may determine a shipping cost sensitivity of each of unique identifiers 134A-134N of items 132A-132N in inventory 130. The shipping cost sensitivity of each of unique identifiers 134A-134N may be related to a sales volume, a billable weight and a shipping zone associated with the respective identifier, e.g., distance to ship the item associated with the identifier form a distribution center to a store. In some embodiments, each identifier may be a unique SKU. Alternatively, each identifier may be a unique UPC or a unique MAC address.

Computing device 104 may also rank the plurality of identifiers based at least in part on the shipping cost sensitivity of each identifier. For example, computing device 104 may rank the unique identifiers 134A-134N based at least in part on the shipping cost sensitivity of each of unique identifiers 134A-134N.

Computing device 104 may additionally determine an order of allocation of the inventory of the plurality of items based at least in part on the ranking of the plurality of identifiers. For example, computing device 104 may determine an order of allocation of inventory 130 of items 132A-132N based at least in part on the ranking of the unique identifiers 134A-134N.

Computing device 104 may further display, or cause to display, the determined order of allocation of the inventory of the plurality of items. For example, computing device 104 may display the determined order of allocation of inventory 130 of items 132A-132N on a display panel of computing device 104, or cause the determined order of allocation to be displayed on a user device 118.

In some embodiments, data and/or information may be transmitted between computing device 104 and user device 118, operated by or otherwise associated with a user 112, via a network 120. Network 120 enables computing device 104 to exchange information with user device 118. Network 120 may include wired and/or wireless networks that enable communications between the various computing devices described in example computing environment 100. In some embodiments, network 120 may include local area networks (LANs), wide area networks (WAN), mobile telephone networks (MTNs), and other types of networks, possibly used in conjunction with one another, to facilitate communication between the various computing devices (e.g., computing device 104 and user device 118). User device 118 may be a mobile or desktop computer, a personal data assistant (PDA), an internet appliance, an internet enabled mobile phone, a server or any other computing device configured with a network connection.

User 112 may be associated with the vendor which owns and operates some or all of inventory 130, distribution centers 140 and 150, and stores 142, 144, 146, 152, 154 and 156. For example, user 112 may be employed by the vendor and be responsible for prioritizing SKU in cost-based inventory allocation with respect to one or more of the distribution centers 140 and 150 and/or one or more of the stores 142, 144, 146, 152, 154 and 156.

Generally, the metric employed to determine the order of elements, e.g., SKUs, is the key factor of any ranking algorithm. Embodiments of an algorithm in accordance with the present disclosure may rank SKUs by the respective shipping cost sensitivity of each SKU with respect to shipping zone to arrive at an allocation decision or recommendation. In other words, those SKUs which tend to incur large increase in total shipping cost with a unit increase in shipping zone may be ranked higher in the list. In some embodiments, sales volume in units (denoted by v) and billable weight (denoted by w) may be two factors that primarily contribute to a SKU's shipping cost besides shipping zone. The sales volume v may include projected future sales volume (e.g., entered by a user) and/or historical sales volume. Additionally, the total cost is denoted by c, the unit shipping cost is denoted by u, and the shipping zone is denoted by z. Typically, the shipping cost sensitivity with respect to shipping zone, $\partial c/\partial z$, denoted by s, is also governed by v and w according to the expression below.

$$s = vF(w,z) \quad (1)$$

Figure 2:
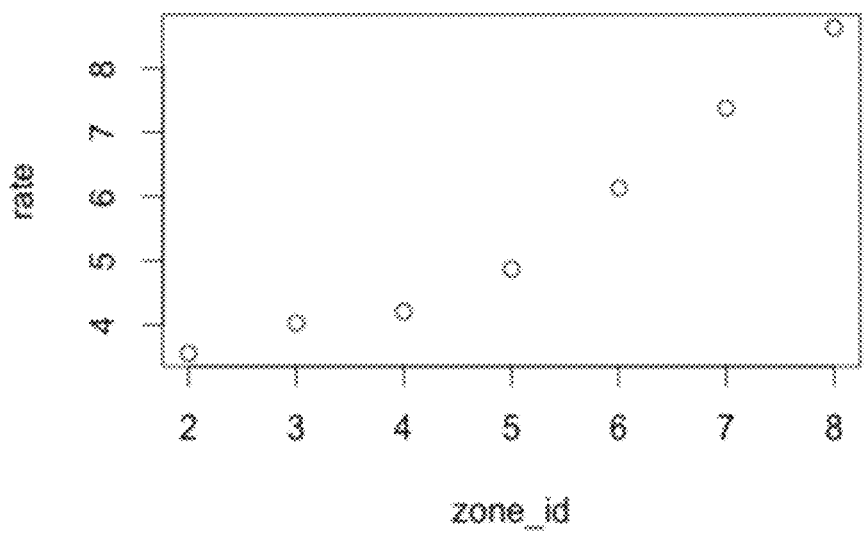
FIG. 2 shows plots of unit shipping rate against shipping zone for two example weights in accordance with an embodiment of the present disclosure.
Figure 2:
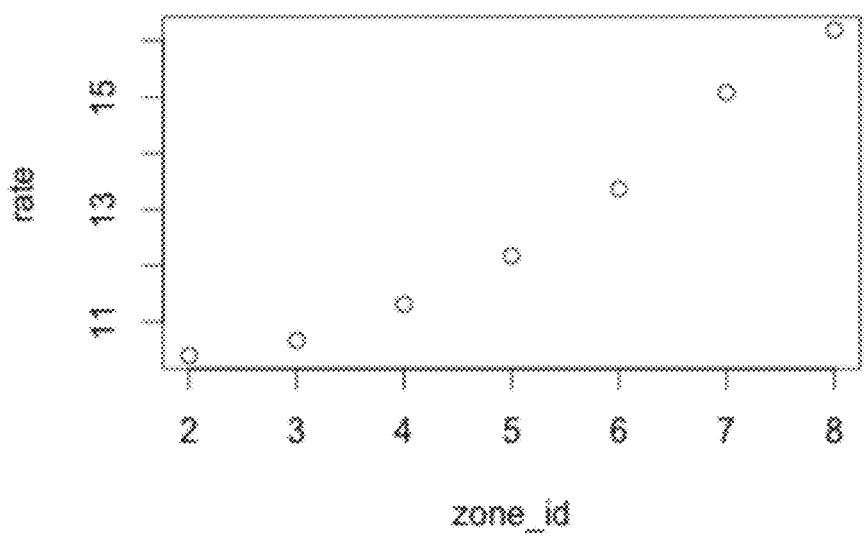

The function $F(w, z)$, or the unit shipping cost sensitivity, is a non-linear function of the weight and shipping zone. Hence, s is linear in v and non-linear in (w, z). However, it can be observed from FIG. 2 that for a given w, the unit shipping cost is approximately linear and, hence, $F(w, z)$ is approximately constant. Accordingly, the gradient $$\frac{u}{z} = F(w)$$

can be computed for each discrete value of w from the rate card. This approximation is based on the observation that, for a given weight, the unit shipping cost with respect to the unit shipping zone is fairly linear. FIG. 2 shows plots of unit shipping rate against shipping zone for two example weights, e.g., 20 pounds and 100 pounds, in accordance with an embodiment of the present disclosure. As shown in FIG. 2, the unit shipping cost versus shipping zone is relatively linear regardless of the weight.

For a given vendor, since the sales volume of a SKU through back-haul routes may only incur negligible shipping cost compared to the regular volume, the total cost sensitivity s is discounted by the back-haul percentage, h, according to the expression below.

$$s = (1-h)vF(w) \quad (2)$$

Such discount may be applicable to any other special shipping mode that is essentially free. Although historical back-haul percentage may be computed from past shipping data, such information is highly incomplete due to the fact that back-haul routes are not necessarily pre-determined and may not have been available for all SKUs. Therefore, the back-haul percentage h may be estimated by a statistical approach. For example, historical back-haul volume may be aggregated (over all SKUs) by weight bins, e.g., 1 pound-10 pounds, 11 pounds-20 pounds, 21 pounds-30 pounds, . . . 191 pounds-200 pounds, and so on, to compute the percentage accordingly.

Figure 3:
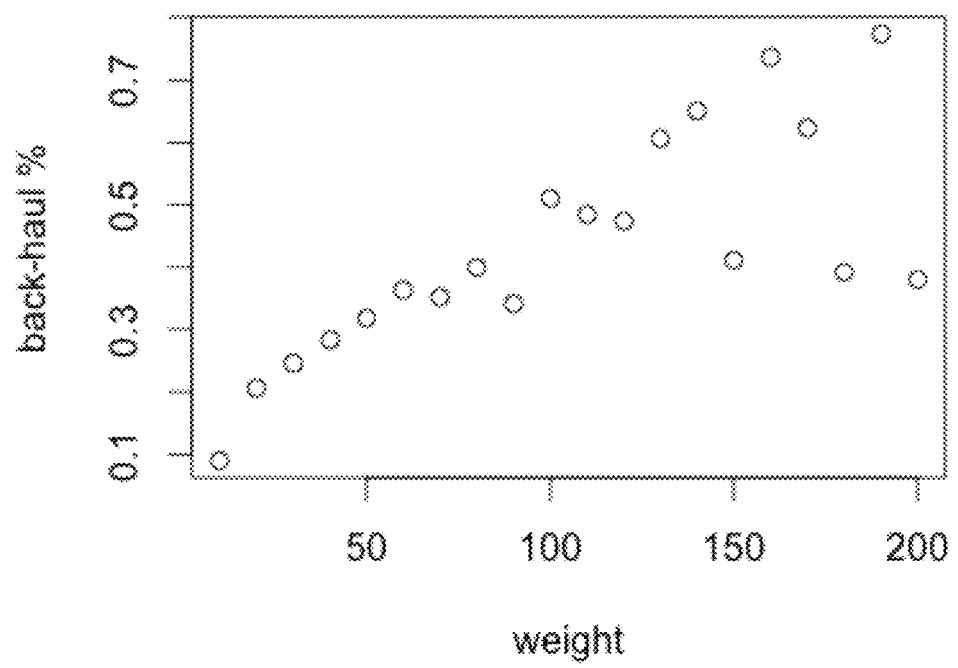
FIG. 3 shows a plot of percentage of back-haul shipping volume versus weight in accordance with an embodiment of the present disclosure.
Figure 4:
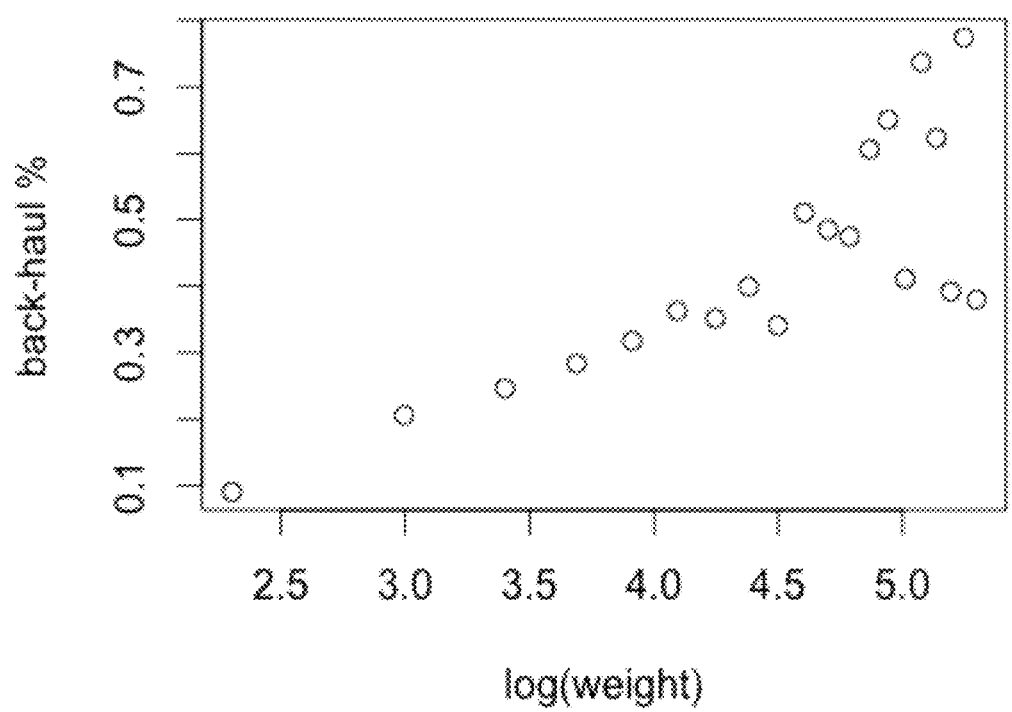
FIG. 4 shows a plot of percentage of back-haul shipping volume versus log scale of weight in accordance with an embodiment of the present disclosure.

FIG. 3 shows a plot of percentage of back-haul shipping volume versus weight in accordance with an embodiment of the present disclosure. FIG. 4 shows a plot of percentage of back-haul shipping volume versus log scale of weight in accordance with an embodiment of the present disclosure. For example, as the logarithm of a number is the exponent to which a base number, e.g., 10, must be raised to produce that number, a weight of 100 pounds would be 2 in log scale of weight (also in pounds) since 2 is the exponent to which 10 is raised to produce 100. Referring to FIG. 3, a linear model may be fit to h with respect to w. However, the estimated h obtained from this model is not bounded by 1. Rather, the estimated h quickly approaches to 1 as weight increases to 300 pounds. To address this issue, a linear model is fit to h with respect to log(w). Referring to FIG. 4, a plot of the sample points and the fitted function is shown.

For illustrative purpose, example diagnostic statistics of the fitted model are shown below. It can be seen that a linear model is reasonable and is utilized in embodiments of the present disclosure.

Call:
lm(formula = bh_pct~log(wt_cat), data = bh.weight)
Residuals:

| Min | 1Q | Median | 3Q | Max |
|---|---|---|---|---|
| −0.206168 | −0.32065 | −0.009926 | 0.050705 | 0.196625 |

Coefficients:

|  | Estimate | Std. Error | T value | Pr (>|t|) |  |
|---|---|---|---|---|---|
| (Intercept) | −0.34271 | 0.13774 | −2.488 | 0.0229 | * |
| log (wt_cat) | 0.17530 | 0.03068 | 5.714 | 2.03e−05 | *** |

Signif. Codes: 0 * 0.001  0.01 * 0.05 . 0.1 1
Residual standard error: 0.1087 on 18 degrees of freedom
Multiple R-squared: 0.6446, Adjusted R-squared: 0.6249
F-statistic: 32.65 on 1 and 18 DF, p-value: 2.035e−05

With the linear model, estimate h for each SKU may be computed based on its weight w: $h=a+bw$, where a is the intercept, and b is the gradient of the linear model. Substituting back into expression (2), the following expression may be obtained:

$$s=(1-(a+bw))vF(w) \qquad (3)$$

In view of the above, in some embodiments, computing device 104 may determine the shipping cost sensitivity according to an expression as follows: $s=vF(w, z)$. In this expression, s denotes the shipping cost sensitivity of a respective identifier, v denotes sales volume in units of an item associated with the respective identifier, w denotes billable weight of the item associated with the respective identifier, z denotes shipping zone of the item associated with the respective identifier, and F(w, z) denotes a function of w and z.

Moreover, computing device 104 may also be configured to determine a back-haul percentage of each identifier of the plurality of identifiers. The back-haul percentage may be related to a back-haul volume of an item, which is associated with a respective identifier of the plurality of identifiers, shipped from a distribution center of a vendor to a physical store of the vendor by transportation, e.g., trucks, operated by the vendor. Additionally, computing device 104 may be further configured to discount the shipping cost sensitivity of the at least one or more identifiers of the plurality of identifiers by the back-haul percentage.

In some embodiments, computing device 104 may determine the shipping cost sensitivity according to an expression as follows: $s=(1-h)vF(w)$. In this expression, s denotes the shipping cost sensitivity of a respective identifier, h denotes the back-haul percentage of the respective identifier, v denotes sales volume in units of an item associated with the respective identifier, w denotes billable weight of the item associated with the respective identifier, and F(w) denotes a function of w.

In some embodiments, in determining the back-haul percentage of each identifier, computing device 104 may estimate the back-haul percentage based on a weight of an item associated with a respective identifier according to an expression as follows: $h=a+bw$. Accordingly, computing device 104 may determine the shipping cost sensitivity according to an expression as follows: $s=(1-(a+bw))vF(w)$. In these expressions, a denotes an intercept of a linear model of h, and b denotes a gradient of the linear model.

In some embodiments, a shipping cost sensitivity of a first identifier of the plurality of identifiers may be higher than a shipping cost sensitivity of a second identifier of the plurality of identifiers. Accordingly, computing device 104 may rank the first identifier higher than the second identifier such that the first identifier is higher than the second identifier in the order of allocation of the inventory of the plurality of items.

Figure 5:
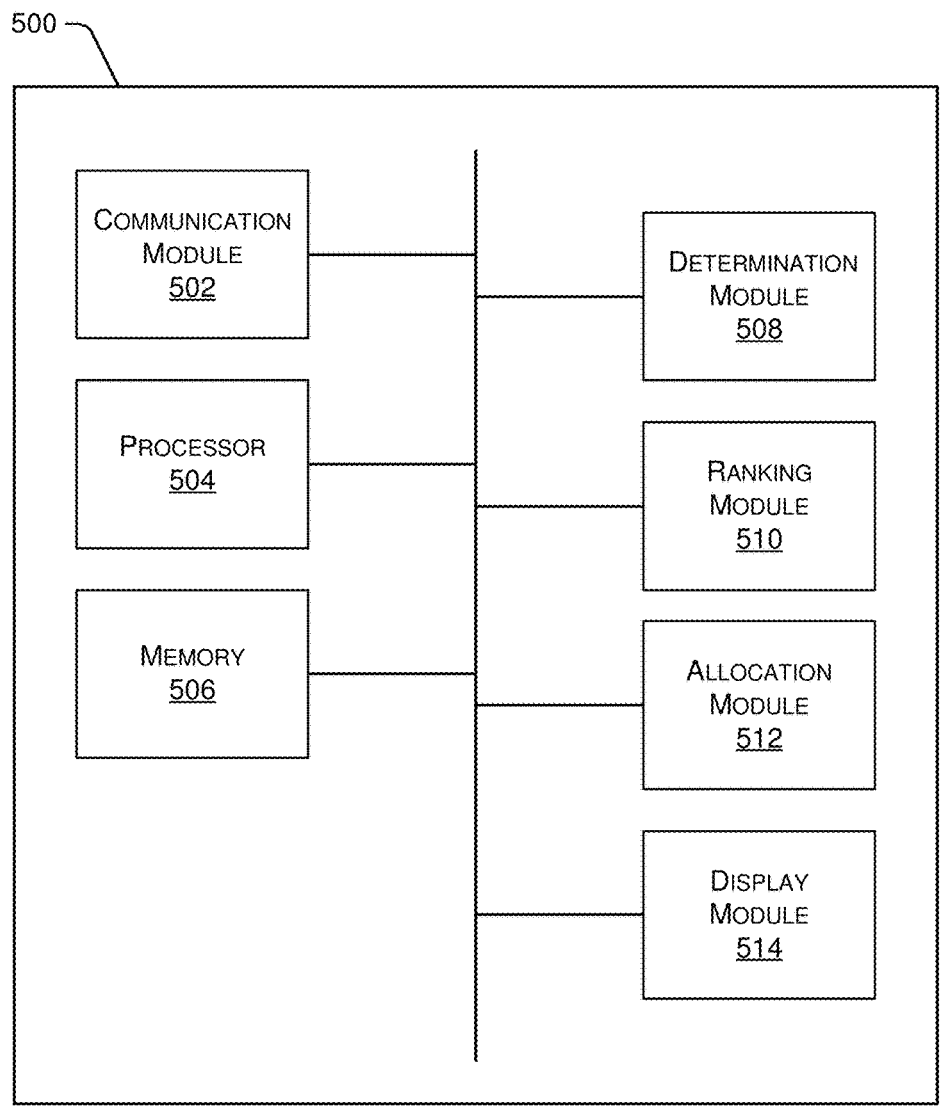
FIG. 5 is a block diagram depicting an embodiment of an apparatus configured to implement prioritizing SKU in cost-based inventory allocation in accordance with an embodiment of the present disclosure.

FIG. 5 is a block diagram depicting an embodiment of a computing device 500 configured to implement systems and methods of the present disclosure. Computing device 500 may be implemented as computing device 104 of FIG. 1, and may perform various functions related to prioritizing SKU in cost-based inventory allocation, as discussed herein. In some embodiments, computing device 500 may be implemented as one or more computing devices that cooperatively implement the functions described herein. Computing device 500 may include a communication module 502, one or more processors (shown as a processor 504 in FIG. 5), and a memory 506. Communication module 502 allows computing device 500 to communicate with other systems, such as communication networks, other servers, etc. Processor 504 executes one or more sets of instructions to implement the functionality provided by computing device 500. Memory 506 stores the one or more sets of instructions executable by processor 504 as well as other data used by processor 504. Computing device 500 may also include a determination module 508, a ranking module 510, an allocation module 512 and a display module 514. Although the determination module 508, ranking module 510, allocation module 512 and display module 514 are depicted as discrete modules separate from the processor 504, in various implementations one or more of determination module 508, ranking module 510, allocation module 512 and display module 514 may be part of the processor 504.

Determination module 508 may be configured to determine a shipping cost sensitivity of each identifier of a plurality of identifiers of a plurality of items in an inventory. For example, determination module 508 may determine a shipping cost sensitivity of each of unique identifiers 134A-134N of items 132A-132N in inventory 130. The shipping cost sensitivity of each of unique identifiers 134A-134N may be related to sales volume, billable weight and shipping zone associated with the respective identifier. In some embodiments, each identifier may be a unique SKU. Alternatively, each identifier may be a unique UPC or a unique MAC address.

In some embodiments, determination module 508 may determine the shipping cost sensitivity according to an expression as follows: $s=vF(w, z)$. In this expression, s denotes the shipping cost sensitivity of a respective identifier, v denotes sales volume in units of an item associated with the respective identifier, w denotes billable weight of the item associated with the respective identifier, z denotes shipping zone of the item associated with the respective identifier, and F(w, z) denotes a function of w and z.

In some embodiments, determination module 508 may also be configured to determine a back-haul percentage of each identifier of the plurality of identifiers. The back-haul percentage may be related to a back-haul volume of an item, which is associated with a respective identifier of the plurality of identifiers, shipped from a distribution center of a vendor to a physical store of the vendor by transportation, e.g., trucks, operated by the vendor. Additionally, determination module 508 may be further configured to discount the shipping cost sensitivity of the at least one or more identifiers of the plurality of identifiers by the back-haul percentage.

In some embodiments, determination module 508 may determine the shipping cost sensitivity according to an expression as follows: $s=(1-h)vF(w)$. In this expression, s denotes the shipping cost sensitivity of a respective identifier, h denotes the back-haul percentage of the respective identifier, v denotes sales volume in units of an item associated with the respective identifier, w denotes billable weight of the item associated with the respective identifier, and F(w) denotes a function of w.

In some embodiments, in determining the back-haul percentage of each identifier, determination module 508 may estimate the back-haul percentage based on a weight of an item associated with a respective identifier according to an expression as follows: $h=a+bw$. Accordingly, determination module 508 may determine the shipping cost sensitivity according to an expression as follows: $s=(1-(a+bw))vF(w)$. In these expressions, a denotes an intercept of a linear model of h, and b denotes a gradient of the linear model.

In some embodiments, a shipping cost sensitivity of a first identifier of the plurality of identifiers may be higher than a shipping cost sensitivity of a second identifier of the plurality of identifiers. Accordingly, determination module 508 may rank the first identifier higher than the second identifier such that the first identifier is higher than the second identifier in the order of allocation of the inventory of the plurality of items.

Ranking module 510 may be configured to rank the plurality of identifiers based at least in part on the shipping cost sensitivity of each identifier. For example, ranking module 510 may rank the unique identifiers 134A-134N based at least in part on the shipping cost sensitivity of each of unique identifiers 134A-134N.

Allocation module 512 may be configured to determine an order of allocation of the inventory of the plurality of items based at least in part on the ranking of the plurality of identifiers. For example, allocation module 512 may determine an order of allocation of inventory 130 of items 132A-132N based at least in part on the ranking of the unique identifiers 134A-134N.

Display module 514 may be configured to display, or cause to display, the determined order of allocation of the inventory of the plurality of items. For example, display module 514 may display the determined order of allocation of inventory 130 of items 132A-132N, or cause the determined order of allocation to be displayed on user device 118.

Figure 6:
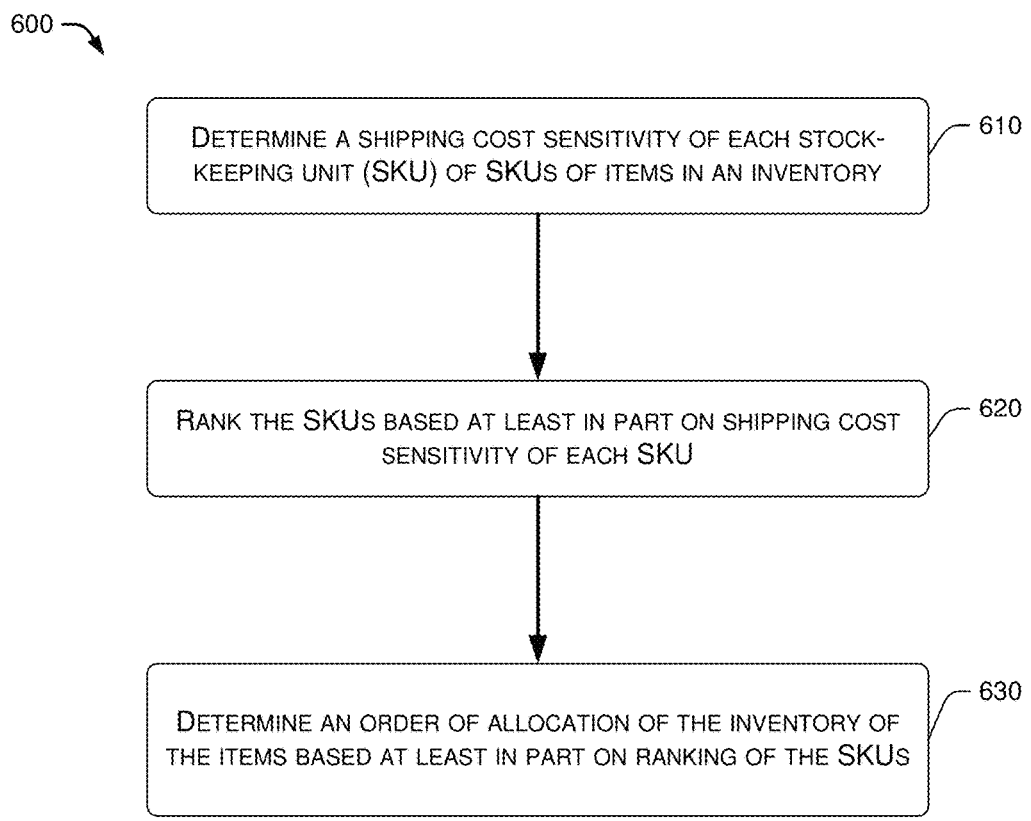
FIG. 6 is a flowchart diagram of an embodiment of a process related to prioritizing SKU in cost-based inventory allocation in accordance with an embodiment of the present disclosure.

FIG. 6 is a flowchart diagram of an embodiment of a process 600 for prioritizing identifier in cost-based inventory allocation in accordance with the present disclosure. Example process 600 includes one or more operations, actions, or functions. Although illustrated as discrete blocks, various blocks may be divided into additional blocks, combined into fewer blocks, or eliminated, depending on the desired implementation. Process 600 may be implemented by one or more processors equipped in, for example, computing device 104 and/or computing device 200. For illustrative purposes, the operations described below are performed by one or more processors of computing device 104 as shown in FIG. 1 and/or processor 204 of computing device 200 as shown in FIG. 2.

At 610, one or more processors of computing device 104 may determine a shipping cost sensitivity of each identifier of a plurality of identifiers of a plurality of items in an inventory. The shipping cost sensitivity of each identifier may be related to sales volume, billable weight and shipping zone associated with the respective identifier. In some embodiments, each identifier may be a unique SKU. Alternatively, each identifier may be a unique UPC or a unique MAC address.

In some embodiments, process 600 may determine the shipping cost sensitivity according to an expression as follows: $s=vF(w, z)$. In this expression, s denotes the shipping cost sensitivity of a respective identifier, v denotes sales volume in units of an item associated with the respective identifier, w denotes billable weight of the item associated with the respective identifier, z denotes shipping zone of the item associated with the respective identifier, and F(w, z) denotes a function of w and z.

At 620, the one or more processors of computing device 104 may rank the plurality of identifiers based at least in part on the shipping cost sensitivity of each identifier.

At 630, the one or more processors of computing device 104 may further determine an order of allocation of the inventory of the plurality of items based at least in part on the ranking of the plurality of identifiers.

In some embodiments, process 600 may also determine a back-haul percentage of each identifier of the plurality of identifiers. The back-haul percentage may be related to a back-haul volume of an item, which is associated with a respective identifier of the plurality of identifiers, shipped from a distribution center of a vendor to a physical store of the vendor by transportation, e.g., trucks, operated by the vendor.

In some embodiments, process 600 may further discount the shipping cost sensitivity of the at least one or more identifiers of the plurality of identifiers by the back-haul percentage.

In some embodiments, process 600 may determine the shipping cost sensitivity according to an expression as follows: $s=(1-h)vF(w)$. In this expression, s denotes the shipping cost sensitivity of a respective identifier, h denotes the back-haul percentage of the respective identifier, v denotes sales volume in units of an item associated with the respective identifier, w denotes billable weight of the item associated with the respective identifier, and F(w) denotes a function of w. In some embodiments, in determining the back-haul percentage of each identifier, process 600 may estimate the back-haul percentage based on a weight of an item associated with a respective identifier according to an expression as follows: $h=a+bw$, and the method may determine the shipping cost sensitivity according to an expression as follows: $s=(1-(a+bw))vF(w)$. In these expressions, a denotes an intercept of a linear model of h, and b denotes a gradient of the linear model.

In some embodiments, a shipping cost sensitivity of a first identifier of the plurality of identifiers may be higher than a shipping cost sensitivity of a second identifier of the plurality of identifiers. Accordingly, process 600 may rank the first identifier higher than the second identifier such that the first identifier is allocated before the second identifier.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method of inventory allocation, the method comprising:
   receiving, with a computing device using one or more processors, via a network, a plurality of identifiers of a plurality of items for an inventory of the plurality of items to be allocated across a network of distribution centers or warehouses for an e-commerce vendor, wherein each item of the plurality of items comprises a sales volume, a billable weight, and a shipping zone relative to a destination for the item;
   preparing, with the computing device, an inventory allocation plan for a pre-set period of time to stock or re-stock a percentage of the inventory of the plurality of items across the network of distribution centers or warehouses for the e-commerce vendor based on at least a shipping cost sensitivity to be assigned to each identifier of the plurality of identifiers for a respective one of the plurality of items in the inventory;
   determining, with the computing device, using a sequential network optimization algorithm, the shipping cost sensitivity for the each identifier of the plurality of identifiers of the plurality of items in the inventory based on the sales volume, the billable weight and the shipping zone associated with a respective identifier of the plurality of identifiers, wherein the shipping cost sensitivity is increased when at least one of the sales volume or the billable weight or the shipping zone for the each identifier in the plurality of identifiers increases while others of the sales volume or the billable weight or the shipping zone remain constant;
   determining, with a site-to-store shipping system from the network of distribution centers or warehouses to one or more brick and mortar stores of the e-commerce vendor, a back-haul shipping route of the each identifier of the plurality of identifiers;
   when the e-commerce vendor operates transportation vehicles to transport the inventory from the network of distribution centers or warehouses to the one or more brick and mortar stores of the e-commerce vendor using the transportation vehicles operated by the e-commerce vendor, wherein a back-haul percentage is based on how full the transportation vehicles operated by the e-commerce vendor from a particular distribution center or warehouse of the network of distribution centers or warehouses are, and wherein the back-haul percentage increases as the transportation vehicles are more full, calculating, with the computing device, the back-haul percentage to be discounted from the shipping cost sensitivity of the each identifier of the plurality of identifiers; or
   when the e-commerce vendor does not operate the transportation vehicles, analyzing, with the computing device, the back-haul percentage based on costs associated with the shipping zone based on a third party carrier price list of shipping costs measured by a unit shipping cost, a weight, and a distance required to ship the plurality of items in the inventory to be transported from the particular distribution center or warehouse to a particular brick and mortar store of the e-commerce vendor;
   adjusting, with the computing device, the shipping cost sensitivity of the each identifier based on the back-haul percentage, wherein the shipping cost sensitivity decreases as the back-haul percentage decreases;
   adjusting, with the computing device, a priority level of the each identifier of the plurality of identifiers based on the shipping cost sensitivity, wherein the priority level increases as the shipping cost sensitivity increases;
   ranking, with the computing device, the each identifier of the plurality of identifiers based at least in part on the priority level of the each identifier; and
   determining, by the one or more processors, a final inventory allocation plan for the pre-set period of time comprising a specific order of allocation of the inventory of the plurality of identifiers of the plurality of items based at least in part on the ranking of the plurality of identifiers, wherein higher-ranking identifiers are stocked first in a first particular distribution center or warehouse of the network of distribution centers or warehouses and wherein lower-ranking identifiers are stocked in remaining space within the first particular distribution center or warehouse of the network of distribution centers or warehouses as per the final inventory allocation plan.

2. The method of claim 1, wherein the determining the shipping cost sensitivity of the each identifier comprises determining the shipping cost sensitivity using the sequential network optimization algorithm according to an expression as follows:

$$s=vF(w,z), \text{ and}$$

wherein s denotes the shipping cost sensitivity of a respective identifier, v denotes sales volume in units of a respective item associated with the respective identifier, w denotes billable weight of the respective item associated with the respective identifier, z denotes shipping zone of the respective item associated with the respective identifier, and F(w, z) denotes a function of w and z.

3. The method of claim 1, wherein the adjusting the shipping cost sensitivity of the each identifier comprises determining the shipping cost sensitivity with the back-haul percentage according to an expression as follows:

$$s=(1-h)vF(w), \text{ and}$$

wherein s denotes the shipping cost sensitivity of a respective identifier, h denotes the back-haul percentage of the respective identifier, v denotes sales volume in units of a respective item associated with the respective identifier, w denotes billable weight of the respective item associated with the respective identifier, F(w) denotes a function of w, and vF(w) comprises the shipping cost sensitivity before being adjusted by the back-haul percentage.

4. The method of claim 3, wherein the calculating the back-haul percentage to be discounted from the shipping cost sensitivity of the each identifier comprises estimating the back-haul percentage based on a weight of an item associated with a respective identifier according to an expression as follows:

$$h=a+bw,$$

wherein determining the shipping cost sensitivity of the each identifier comprises determining the shipping cost sensitivity according to an expression as follows:

$$s=(1-(a+bw))vF(w), \text{ and}$$

wherein a denotes an intercept of a linear model of h, and b denotes a gradient of the linear model.

5. The method of claim 1, wherein:
   the inventory of the network of distribution centers or warehouses and the one or more brick and mortar stores for an e-commerce vendor is owned and operated by (a) same vendors or (b) different vendors.

6. The method of claim 1, wherein the site-to-store shipping system further comprises a shipping method and a delivery method specific to a given vendor, wherein an order from a customer is shipped from a distribution center of the given vendor to a brick and mortar retail store of the given vendor for pick up by the customer.

7. The method of claim 6, wherein the shipping method and the delivery method are free of charge to the customer.

8. One or more computer-readable media storing computer-executable instructions that, when executed on one or more processors, causes the one or more processors to perform operations comprising:
receiving via a network, a plurality of identifiers of a plurality of items for an inventory of the plurality of items to be allocated across a network of distribution centers or warehouses for an e-commerce vendor, wherein each item of the plurality of items comprises a sales volume, a billable weight, and a shipping zone relative to a destination for the item;
preparing an inventory allocation plan for a pre-set period of time to stock or re-stock a percentage of the inventory of the plurality of items across the network of distribution centers or warehouses for the e-commerce vendor based on at least a shipping cost sensitivity to be assigned to each identifier of the plurality of identifiers for a respective one of the plurality of items in the inventory;
determining, using a sequential network optimization algorithm, the shipping cost sensitivity for the each identifier of the plurality of identifiers of the plurality of items in the inventory based on the sales volume, the billable weight and the shipping zone associated with a respective identifier of the plurality of identifiers, wherein the shipping cost sensitivity is increased when at least one of the sales volume or the billable weight or the shipping zone for the each identifier in the plurality of identifiers increases while other of the sales volume or the billable weight or the shipping zone remain constant;
determining, with a site-to-store shipping system from the network of distribution centers or warehouses to one or more brick and mortar stores of the e-commerce vendor, a back-haul shipping route of the each identifier of the plurality of identifiers;
when the e-commerce vendor operates transportation vehicles to transport the inventory from the network of distribution centers or warehouses to the one or more brick and mortar stores of the e-commerce vendor using the transportation vehicles operated by the e-commerce vendor, wherein a back-haul percentage is based on how full the transportation vehicles operated by the e-commerce vendor from a particular distribution center or warehouse of the network of distribution centers or warehouses are, and wherein the back-haul percentage increases as the transportation vehicles are more full, calculating the back-haul percentage to be discounted from the shipping cost sensitivity of the each identifier of the plurality of identifiers; or
when the e-commerce vendor does not operate the transportation vehicles, analyzing the back-haul percentage based on costs associated with the shipping zone based on a third party carrier price list of shipping costs measured by a unit shipping cost, a weight, and a distance required to ship the plurality of items in the inventory to be transported from the particular distribution center or warehouse to a particular brick and mortar store of the e-commerce vendor;
adjusting the shipping cost sensitivity of the each identifier based on the back-haul percentage, wherein the shipping cost sensitivity decreases as the back-haul percentage decreases;
adjusting a priority level of the each identifier of the plurality of identifiers based on the shipping cost sensitivity, wherein the priority level increases as the shipping cost sensitivity increases;
ranking the each identifier of the plurality of identifiers based at least in part on the priority level of the each identifier; and
determining a final inventory allocation plan for the pre-set period of time comprising a specific order of allocation of the inventory of the plurality of identifiers of the plurality of items based at least in part on the ranking of the plurality of identifiers, wherein higher-ranking identifiers are stocked first in a first particular distribution center or warehouse of the network of distribution centers or warehouses and wherein lower-ranking identifiers are stocked in remaining space within the first particular distribution center or warehouse of the network of distribution centers or warehouses as per the final inventory allocation plan.

9. The one or more computer-readable media of claim 8, wherein the determining, using the sequential network optimization algorithm, the shipping cost sensitivity of the each identifier comprises determining the shipping cost sensitivity using the sequential network optimization algorithm according to an expression as follows:

$$s=vF(w,z), \text{ and}$$

wherein s denotes the shipping cost sensitivity of a respective identifier, v denotes sales volume in units of a respective item associated with the respective identifier, w denotes billable weight of the respective item associated with the respective identifier, z denotes shipping zone of the respective item associated with the respective identifier, and F(w, z) denotes a function of w and z.

10. The one or more computer-readable media of claim 8, wherein the determining, using the sequential network optimization algorithm, the shipping cost sensitivity of the each identifier comprises determining the shipping cost sensitivity with the back-haul percentage according to an expression as follows:

$$s=(1-h)vF(w), \text{ and}$$

wherein h denotes the back-haul percentage of the respective identifier, and F(w) denotes a function of w.

11. The one or more computer-readable media of claim 10, wherein the determining the back-haul percentage of the each identifier comprises estimating the back-haul percentage based on a weight of an item associated with a respective identifier according to an expression as follows:

$$h=a+bw,$$

wherein determining the shipping cost sensitivity of the each identifier comprises determining the shipping cost sensitivity according to an expression as follows:

$$s=(1-(a+bw))vF(w), \text{ and}$$

wherein a denotes an intercept of a linear model of h, and b denotes a gradient of the linear model.

12. The one or more computer-readable media of claim 8, wherein:

the inventory of the network of distribution centers or warehouses and the one or more brick and mortar stores for an e-commerce vendor is owned and operated by (a) same vendors or (b) different vendors.

13. The one or more computer-readable media of claim 8, wherein the site-to-store shipping system further comprises a shipping method and a delivery method specific to a given vendor, wherein an order from a customer is shipped from a distribution center of the given vendor to a brick and mortar retail store of the given vendor for pick up by the customer.

14. The one or more computer-readable media of claim 13, wherein the shipping method and the delivery method are free of charge to the customer.

15. An apparatus comprising:
a memory configured to store data and one or more sets of instructions; and
one or more processors coupled to the memory, the one or more processors configured to execute the one or more sets of instructions and perform operations comprising:
receiving via a network, a plurality of identifiers of a plurality of items for an inventory of the plurality of items to be allocated across a network of distribution centers or warehouses for an e-commerce vendor, wherein each item of the plurality of items comprises a sales volume, a billable weight, and a shipping zone relative to a destination for the item;
preparing an inventory allocation plan for a pre-set period of time to stock or re-stock a percentage of the inventory of the plurality of items across the network of distribution centers or warehouses for the e-commerce vendor based on at least a shipping cost sensitivity to be assigned to each identifier of the plurality of identifiers for a respective one of the plurality of items in the inventory;
determining, using a sequential network optimization algorithm, the shipping cost sensitivity for the each identifier of the plurality of identifiers of the plurality of items in the inventory, based on the sales volume, the billable weight and the shipping zone associated with a respective identifier of the plurality of identifiers, wherein the shipping cost sensitivity is increased when at least one of the sales volume or the billable weight or the shipping zone for the each identifier of the plurality of identifiers increases while others of the sales volume or the billable weight or the shipping zone remain constant;
determining with a site-to-store shipping system from the network of distribution centers or warehouses to one or more brick and mortar stores of the e-commerce vendor, a back-haul shipping route of the each identifier of the plurality of identifiers;
when the e-commerce vendor operates transportation vehicles to transport the inventory from the network of distribution centers or warehouses to the one or more brick and mortar stores of the e-commerce vendor using the transportation vehicles operated by the e-commerce vendor, wherein a back-haul percentage is based on how full the transportation vehicles operated by the e-commerce vendor from a particular distribution center or warehouse of the network of distribution centers or warehouses are, and wherein the back-haul percentage increases as the transportation vehicles are more full, calculating the back-haul percentage to be discounted from the shipping cost sensitivity of the each identifier of the plurality of identifiers; or
when the e-commerce vendor does not operate the transportation vehicles, analyzing the back-haul percentage based on costs associated with the shipping zone based on a third party carrier price list of shipping costs measured by a unit shipping cost, a weight, and a distance required to ship the plurality of items in the inventory to be transported from the particular distribution center or warehouse to a particular brick and mortar store of the e-commerce vendor;
adjusting the shipping cost sensitivity of the each identifier based on the back-haul percentage, wherein the shipping cost sensitivity decreases as the back-haul percentage decreases;
adjusting a priority level of the each identifier of the plurality of identifiers based on the shipping cost sensitivity, wherein the priority level increases as the shipping cost sensitivity increases;
ranking the each identifier of the plurality of identifiers based at least in part on the priority level of the each identifier; and
determining a final inventory allocation plan for the pre-set period of time comprising a specific order of allocation of the inventory of the plurality of identifiers of the plurality of items based at least in part on the ranking of the plurality of identifiers, wherein higher-ranking identifiers are stocked first in a first particular distribution center or warehouse of the network of distribution centers or warehouses and wherein lower-ranking identifiers are stocked in remaining space within the first particular distribution center or warehouse of the network of distribution centers or warehouses as per the final inventory allocation plan.

16. The apparatus of claim 15, wherein the one or more processors determine the shipping cost sensitivity using the sequential network optimization algorithm according to an expression as follows:

$$s=vF(w,z), \text{ and}$$

wherein s denotes the shipping cost sensitivity of a respective identifier, v denotes sales volume in units of a respective item associated with the respective identifier, w denotes billable weight of the respective item associated with the respective identifier, z denotes shipping zone of the respective item associated with the respective identifier, and F(w, z) denotes a function of w and z.

17. The apparatus of claim 15, wherein the one or more processors determine the shipping cost sensitivity with the back-haul percentage according to an expression as follows:

$$s=(1-h)vF(w), \text{ and}$$

wherein s denotes the shipping cost sensitivity of a respective identifier, h denotes the back-haul percentage of the respective identifier, v denotes sales volume in units of a respective item associated with the respective identifier, w denotes billable weight of the respective item associated with the respective identifier, and F(w) denotes a function of w.

18. The apparatus of claim 17, wherein, in determining the back-haul percentage of the each identifier, the one or more processors estimate the back-haul percentage based on a weight of an item associated with a respective identifier according to an expression as follows:

$$h=a+bw,$$

wherein the one or more processors determine the shipping cost sensitivity according to an expression as follows:

$$s=(1-(a+bw))vF(w), \text{ and}$$

wherein a denotes an intercept of a linear model of h, and b denotes a gradient of the linear model.

19. The apparatus of claim 15, wherein the site-to-store shipping system further comprises a shipping method and a delivery method specific to a given vendor, wherein an order from a customer is shipped from a distribution center of the given vendor to a brick and mortar retail store of the given vendor for pick up by the customer.

20. The apparatus of claim 19, wherein the shipping method and the delivery method are free of charge to the customer.

* * * * *